US011065959B2

United States Patent
Michalakis

(10) Patent No.: US 11,065,959 B2
(45) Date of Patent: Jul. 20, 2021

(54) CONDITION-BASED DETERMINATION AND INDICATION OF REMAINING ENERGY RANGE FOR VEHICLES

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1 day.

(21) Appl. No.: 15/916,662

(22) Filed: Mar. 9, 2018

(65) Prior Publication Data

US 2019/0275887 A1  Sep. 12, 2019

(51) Int. Cl.

| B60W 20/00 | (2016.01) |
| B60W 50/14 | (2020.01) |
| B60Q 1/00 | (2006.01) |
| G08G 1/00 | (2006.01) |
| G06Q 30/02 | (2012.01) |
| G08G 1/123 | (2006.01) |
| B60K 35/00 | (2006.01) |
| B60L 58/13 | (2019.01) |
| B60W 50/00 | (2006.01) |

(52) U.S. Cl.
CPC .............. *B60K 35/00* (2013.01); *B60L 58/13* (2019.02); *B60K 2370/16* (2019.05); *B60L 2250/16* (2013.01); *B60L 2260/52* (2013.01); *B60L 2260/54* (2013.01); *B60W 2050/0089* (2013.01); *B60W 2510/244* (2013.01); *B60W 2530/209* (2020.02)

(58) Field of Classification Search
None
See application file for complete search history.

(56) References Cited

U.S. PATENT DOCUMENTS

| 5,627,453 A | 5/1997 | Sheehan et al. |
| 6,625,539 B1 * | 9/2003 | Kittell .................. B60L 3/12 |
| | | 701/29.3 |
| 9,612,130 B2 | 4/2017 | Liu et al. |
| 2012/0179314 A1 | 7/2012 | Gilman et al. |

(Continued)

FOREIGN PATENT DOCUMENTS

WO  WO2014102812 A1  7/2014

*Primary Examiner* — Maceeh Anwari
*Assistant Examiner* — Laura E Linhardt
(74) *Attorney, Agent, or Firm* — Christopher G. Darrow; Darrow Mustafa PC

(57) ABSTRACT

Systems and methods for determining and indicating an energy range of a host vehicle. A sensor can be positioned to acquire data corresponding to an amount of energy stored in an energy storage system of the host vehicle. An anticipated operating condition for a forthcoming location of the host vehicle can be determined based on at least one operating condition provided from at least one of a plurality of vehicles that 1) has a vehicle type that is the same as a vehicle type of the host vehicle and 2) is located at a respective location that is proximate to the forthcoming location of the host vehicle. The remaining energy range can be determined based on 1) the amount of energy stored in the energy storage system and 2) the anticipated operating condition, and an output system of the host vehicle can indicate the remaining energy range for the host vehicle.

19 Claims, 4 Drawing Sheets

(56) References Cited

U.S. PATENT DOCUMENTS

| | | | |
|---|---|---|---|
| 2014/0121956 A1 | 5/2014 | Jastrzebski | |
| 2014/0316865 A1* | 10/2014 | Okamoto | G08G 1/22 |
| | | | 705/14.1 |
| 2018/0370523 A1* | 12/2018 | Geller | B60W 20/12 |
| 2019/0016329 A1* | 1/2019 | Park | B60K 6/46 |

* cited by examiner

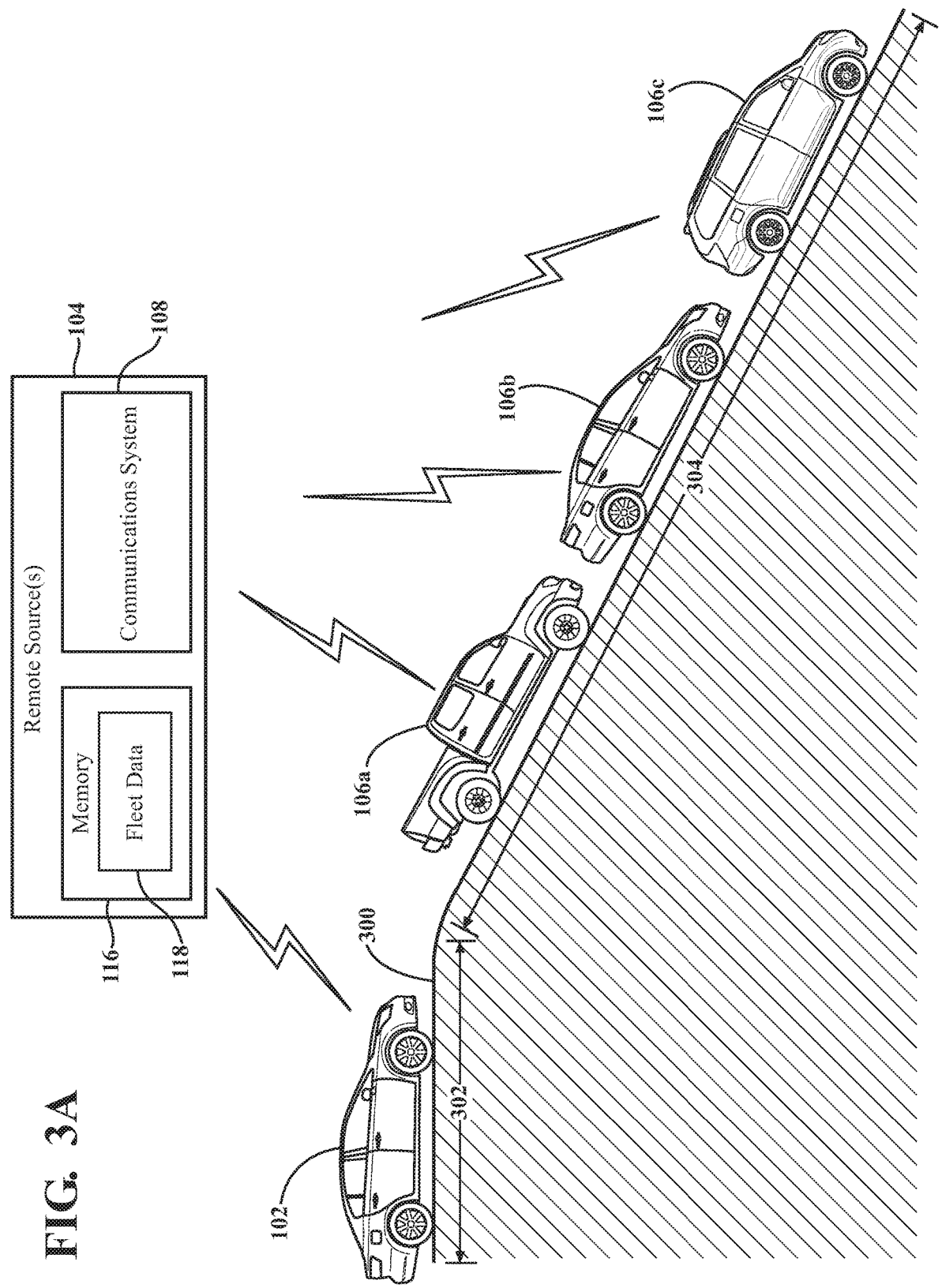

CONDITION-BASED DETERMINATION AND INDICATION OF REMAINING ENERGY RANGE FOR VEHICLES

TECHNICAL FIELD

The subject matter described herein relates generally to energy systems in vehicles, and, more specifically, to indication of a remaining energy range for a vehicle.

BACKGROUND

All vehicles run on some form of energy. In a typical vehicle, energy, such as fuel or batteries, is used to power a prime mover of the vehicle.

Additionally, many vehicles provide some form of an indication of a remaining energy range. The remaining energy range is typically calculated based on the remaining amount of energy stored in the energy storage system (e.g., fuel tanks, batteries, etc.). In some instances, the remaining energy range may be overestimated or underestimated. This can be problematic, such as in instances where the vehicle is en-route to a destination and occupants rely on the underestimated energy range of the vehicle, resulting in the vehicle running out of energy.

SUMMARY

The present disclosure describes estimating the remaining energy range by taking into consideration additional inputs, such as operating conditions of similarly situated remote vehicles. As a result, the present disclosure creates a more accurate estimate of the remaining energy range for a vehicle.

In one example, a system for indicating an energy range of a host vehicle is described. The system can include an energy storage system for storing one or more types of energy for powering a prime mover of a host vehicle. The system can also include a sensor for acquiring data corresponding to an amount of energy stored in the energy storage system. The system can also include an output system for providing, to an occupant of the vehicle, information corresponding to the amount of energy stored in the energy storage system. The system can also include a communications system for communicating with one or more remote sources. The one or more remote sources can be configured to compile data from a plurality of vehicles with each respective vehicle of the plurality of vehicles having a vehicle type. The compiled data can include at least one operating condition provided from each respective vehicle of the plurality of vehicles at a respective location. The system can include one or more processors operatively connected to the sensor, the output system, and the communications system. The system can include memory operatively connected to the processor. The memory can store instructions that, when executed by the processor, cause the processor to control the output system of the host vehicle to provide an indication of a remaining energy range for the vehicle. The remaining energy range can be determined based on 1) the amount of energy stored in the energy storage system corresponding to the data acquired by the sensor. The remaining energy range can also be determined based on 2) an anticipated operating condition for a forthcoming location of the host vehicle. The anticipated operating condition can be determined based on a subset of the compiled data. The subset can include the at least one operating condition provided from at least one of the plurality of vehicles that has a vehicle type that is the same as a vehicle type of the host vehicle and that was also provided by the at least one vehicle when it was at a respective location that is proximate to the forthcoming location of the host vehicle.

In another example, a method for indicating an energy range of a vehicle is described. The method can include acquiring, via a sensor in a host vehicle, data corresponding to an amount of energy stored in an energy storage system of the host vehicle. The method can also include controlling an output system of the host vehicle to provide an indication of a remaining energy range for the host vehicle. The remaining energy range can be determined based on 1) the amount of energy stored in the energy storage system based on data acquired by the sensor. The remaining energy range can also be determined based on 2) an anticipated operating condition for a forthcoming location of the host vehicle. The anticipated operating condition can be determined based on a subset of compiled data from one or more remote sources. The subset can include at least one operating condition provided from at least one of a plurality of vehicles that has a vehicle type that is the same as a vehicle type of the host vehicle and that was also provided by the at least one vehicle when it was at a respective location that is proximate to the forthcoming location of the host vehicle.

In another example, a method for determining an energy range of a vehicle is described. The method can include receiving data acquired by a sensor arranged to detect an amount of energy stored in an energy storage system of a host vehicle. The method can also include identifying data from one or more remote sources, the one or more remote sources configured to compile data from a plurality of vehicles with each respective vehicle of the plurality of vehicles having a vehicle type, the compiled data including at least one operating condition provided from each respective vehicle of the plurality of vehicles at a respective location. The method can include determining a forthcoming location of the host vehicle. The method can include determining a vehicle type for the host vehicle. The method can include determining an anticipated operating condition for the vehicle when the vehicle is located at the forthcoming location. The anticipated operating condition can be determined based on a subset of compiled data from one or more remote sources. The subset can include at least one operating condition provided from at least one of a plurality of vehicles that has a vehicle type that is the same as a vehicle type of the host vehicle and that was also provided by the at least one vehicle when it was at a respective location that is proximate to the forthcoming location of the host vehicle. The method can include determining, based on the anticipated operating condition and the data acquired by the sensor, a remaining energy range of the host vehicle. The remaining energy range of the host vehicle being rendered on an output system of the host vehicle to indicate the remaining energy range of the host vehicle to an occupant of the host vehicle.

BRIEF DESCRIPTION OF THE DRAWINGS

FIG. 3A and FIG. 3B are example environments within which the disclosed systems/methods may be implemented.

DETAILED DESCRIPTION

Systems and methods for determining and indicating a remaining energy range of a host vehicle are described. A sensor can be positioned to acquire data corresponding to an amount of energy stored in an energy storage system of the host vehicle. An anticipated operating condition for a forthcoming location (e.g., a location ahead of and along the route being traveled upon) of the host vehicle can be determined. The anticipated operating condition can be determined based on at least one operating condition provided by at least one of multiple vehicles that has a vehicle type that is the same as a vehicle type of the host vehicle. The operating condition can be provided by the vehicle when it was at a respective location that is proximate to the forthcoming location of the host vehicle. An output system of the host vehicle can be controlled to provide an indication of the remaining energy range for the host vehicle. The remaining energy range can be determined based on 1) the amount of energy stored in the energy storage system based on data acquired by the sensor and 2) an anticipated operating condition for a forthcoming location of the host vehicle.

The arrangements disclosed herein can mitigate the likelihood of occupants of the host vehicle overestimating the remaining energy range of the host vehicle. Additionally, the arrangements disclosed herein can better estimate the remaining energy range of the host vehicle by taking into consideration operating conditions from similarly situated vehicle(s) when they are (or were) located proximate to a forthcoming location of the host vehicle. Additionally, arrangements disclosed herein can provide better feedback to a driver based according to further inputs not currently used. Examples of such feedback can include, for instance, an indication to re-energize the host vehicle and energy conservation tips for the driver to implement when the host vehicle is located at the forthcoming location. Many additional benefits of the disclosed arrangements will become apparent upon further discussion below.

Figure 1:
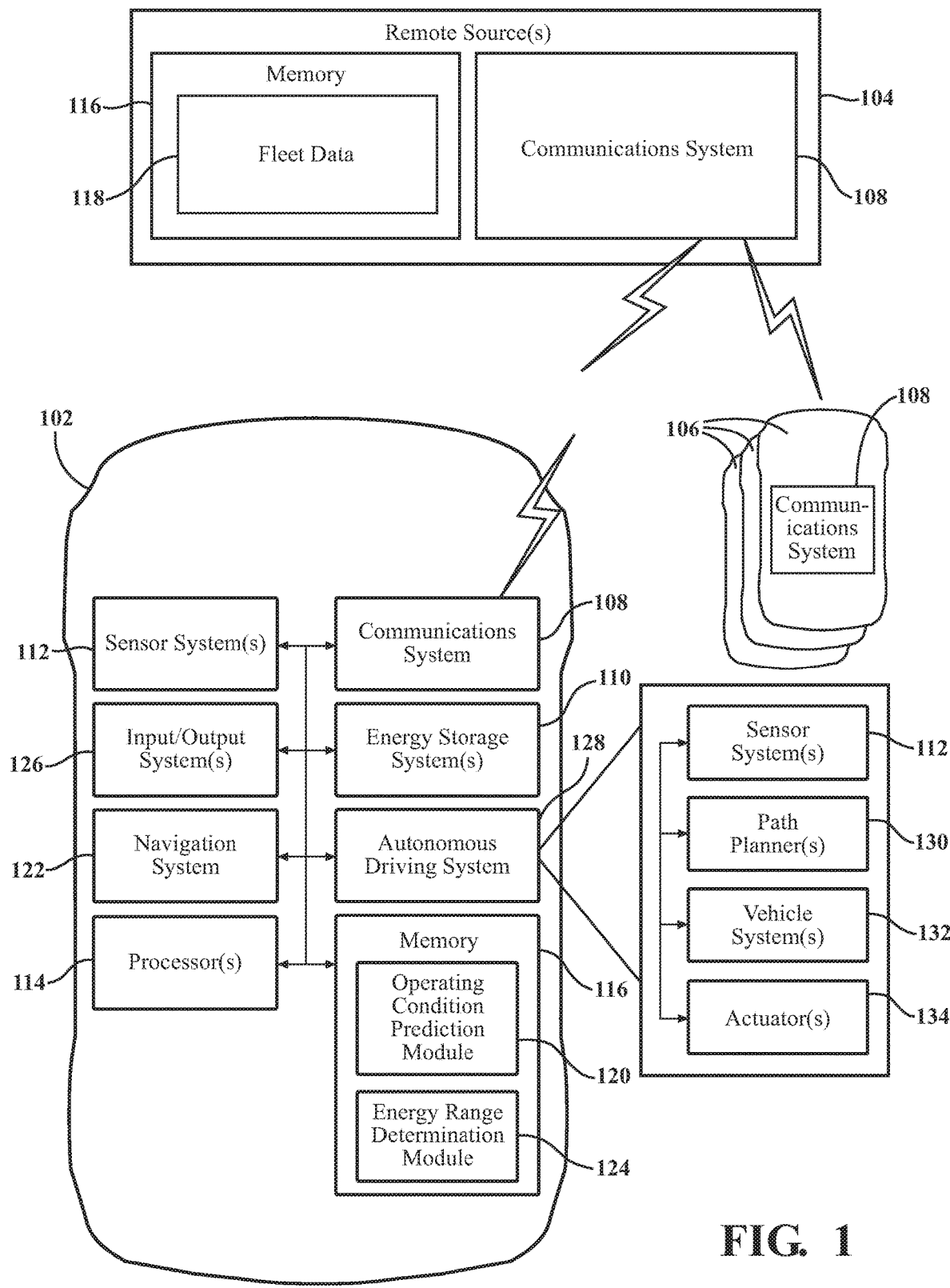
FIG. 1 is a system of determining and indicating a remaining energy range for a host vehicle.

Referring to FIG. 1, a system 100 is shown. The system 100 can include a host vehicle 102 and one or more remote sources 104. The host vehicle 102 and the remote source(s) 104 can be in wireless communication with one another. As used herein, a "vehicle" is any form of motorized transport. In one or more implementations, the host vehicle 102 is an automobile. While arrangements will be described herein with respect to automobiles, it will be understood that embodiments are not limited to automobiles and can include other forms of motorized transport. As will be described in greater detail below, the host vehicle 102 can be a highly automated vehicle.

The host vehicle 102 can have a vehicle type. Examples of vehicle types include make and model (e.g., a Toyota Prius), body style (e.g., sedan, pick-up, recreational vehicle, minivan, etc.), type of energy (e.g., gasoline, diesel, battery, hybrid-electric, etc.) for powering a prime mover (e.g., engine, electrically powered motor, etc.), and combinations thereof.

The remote source(s) 104 can be a remote server, one or more remote processors wirelessly connected to the host vehicle, etc., to name a few possibilities. The remote source(s) 104 can be configured to manage one or more types of data. For instance, the remote source(s) 104 can be configured to transmit and receive data to and from remote locations, such as the host vehicle 102. While one remote source(s) 104 is shown, in some instances, the system 100 may include multiple remote sources 104. In instances such as these, each of the multiple remote sources 104 can be configured to manage specific types of data and tasks. Additionally, each of the multiple remote sources 104 can be configured to communicate with one another.

The remote source(s) 104 can be configured to communicate with a plurality of remote vehicles 106. Similar to the host vehicle 102, each of the remote vehicles 106 can have a respective vehicle type. Examples of vehicle types include make and model (e.g., a Toyota Prius), body style (e.g., sedan, pick-up, recreational vehicle, minivan, etc.), type of energy (e.g., gasoline, diesel, battery, hybrid-electric, etc.) for powering a prime mover (e.g., engine, electrically powered motor, etc.), and combinations thereof. In some instances, the host vehicle 102 can have the same vehicle type as one or more of the remote vehicles 106. For example, the host vehicle 102 may be a Toyota Prius, and one or more of the remote vehicles 106 may also be a Toyota Prius. As another example, the host vehicle 102 may be a sedan, and one or more of the remote vehicles 106 may also be sedans. As another example, the host vehicle 102 may be a hybrid electric vehicle, and one or more of the remote vehicles 106 may also be hybrid electric vehicles.

As will be discussed in greater detail below, a remaining energy range for the host vehicle 102 can be determined based on operating characteristics for at least one of the remote vehicles 106 that have the same vehicle type as the host vehicle 102.

The remote source(s) 104 can include a communications system 108. The communications system 108 is or includes any device, component, or group of devices/components configured to communicate wirelessly to another location. For instance, the communications system 108 can include an antenna tuned to transmit and/or receive data to and/or from another antenna at a frequency. The remote source(s) 104 can transmit data and receive data to one or more remote locations that are not physically connected to the remote source(s) 104 using the communications system 108.

The communications system 108 can be configured to communicate with the host vehicle 102 and/or the remote vehicle(s) 106. For instance, each of the host vehicle 102 and the remote vehicle(s) 106 can include a respective communications system 108. The communications system 108 of the host vehicle 102 can include an antenna tuned to exchange data with the antenna of the communications system 108 of the remote source(s) 104. Similarly, the communications system 108 of the remote vehicle(s) 106 can include respective antennas tuned to exchange data with the antenna of the communications system 108 of the remote source(s) 104. In some instances, the communications system 108 for the host vehicle 102 can be configured to exchange data with the communications system 108 for the remote vehicle(s) 106. The communications system 108 can communicate via one or more communications networks including, for instance, a cellular network, Bluetooth, WI-FI, vehicle-to-X (e.g., vehicle-to-vehicle, vehicle-to-infrastructure, etc.) communications, to name a few possibilities. In some arrangements, the host vehicle 102 can retrieve and/or request data from the remote source(s) 104. Additionally or alternatively, the remote source(s) 104 can transmit data to the host vehicle 102. In this regard, the host vehicle 102, the remote source(s) 104, and the remote vehicle(s) 106 can be configured to exchange data with one another according to various arrangements.

The host vehicle 102 can include an energy storage system 110. The energy storage system 110 can include any device, component, and/or group of device(s)/component(s) configured to store one or more types of energy. For instance, the energy storage system 110 can include a fuel tank for storing a type of fuel (e.g., gasoline). Additionally or alternatively, the energy storage system can include one or more batteries. The fuel and/or batteries can be used to power a prime mover (not shown) of the host vehicle 102.

The host vehicle 102 can include a sensor system 112. The sensor system 112 can include one or more sensor(s). "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the host vehicle 102 includes a plurality of sensors, the sensors can work independently from each other. Alternatively, two or more of the sensors can work in combination with each other. In such case, the two or more sensors can form a sensor network. The sensor(s) can be operatively connected to other device(s)/component(s)/element(s) of the host vehicle 102. The term "operatively connected," as used throughout this description, can include direct or indirect connections, including connections without direct physical contact.

The sensor system 112 can include one or more energy level sensors. The energy level sensor(s) included in the sensor system 112 can depend on the energy storage system 110. For example, the energy level sensor(s) included in the sensor system 112 can depend on the type of energy stored in the energy storage system 110.

For instance, where fuel is stored in the energy storage system 110, the sensor system 112 can include one or more fuel level sensors. In one or more arrangements, the fuel level sensor(s) can be or include a potentiometer and a float. In this example, as the fuel level changes, the float moves within a fuel tank of the energy storage system 110. The float moving within the fuel tank can result in changes to the resistance of the potentiometer. As such, the resistance of the potentiometer changes with changes in the fuel level. In one or more arrangements, the fuel level sensor(s) can include a radar, sonar, LIDAR, or other sensor that transmits a signal and generates data responsive to detecting the transmitted signal. In this example, the fuel level sensor(s) can be mounted near the inlet of the fuel tank. The fuel level sensor(s) can transmit a signal towards fuel in the fuel tank. The signal can be reflected off the fuel and received by the fuel level sensor(s). The fuel level sensor(s) can generate data corresponding to the time it takes to receive the transmitted signal. Based on the data, the fuel level sensor(s) can determine a fuel level in the fuel tank. Although these two examples are provided for types of fuel level sensor(s), many other types of fuel level sensor(s) may be used. Accordingly, the present disclosure is not limited to these types of fuel level sensor(s).

As another example, where the energy storage system 110 includes one or more batteries, the sensor system 112 can include one or more battery charge sensors. The battery charge sensor(s) can be configured to monitor, detect, and/or assess an amount of energy stored in the batteries. In one example, the energy storage system 110 can include one or more sensors to detect an open circuit potential (e.g., the electrical potential between an anode and a cathode for the one or more batteries). Additionally or alternatively, the energy storage system can include one or more sensors to detect a closed circuit potential (e.g., the electrical potential across a known load on the one or more batteries). As another example, the energy storage system can include a sensor to measure an amount of battery discharge over time (for instance, a coulomb counter). While these examples are provided, many alternative sensor arrangements may be implemented in the energy storage system 110 to determine a remaining energy available in the one or more batteries.

In each of these examples, the sensor system 112 can include one or more energy level sensor(s) configured to acquire data corresponding to an amount of energy remaining in the energy storage system 110.

The host vehicle 102 includes one or more processors 114. The processor(s) 114 are configured to implement or perform various functions described herein. In one or more arrangements, the processor(s) 114 can be a main processor of the host vehicle 102. For instance, the processor(s) 114 can be an electronic control unit (ECU). The processor(s) 114 can use instructions to determine an energy range for the host vehicle 102 based on information from the remote source(s) 104 and the data acquired by the sensor(s) of the sensor system 112. While shown on the host vehicle 102, in some instances the processor(s) 114 can located remote from the host vehicle 102. For example, the processor(s) 114 can be located at the remote source(s) 104. Accordingly, in some instances, the processor(s) 114 can determine the energy range for the host vehicle 102 on-board the host vehicle 102. In other instances, the processor(s) 114 can determine the energy range for the host vehicle 102 off-board the host vehicle 102 and can communicate the energy range to the host vehicle 102 (e.g., via the communications system 108).

The system 100 can include memory 116 for storing one or more types of data. The memory 116 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 116 can be a component of the processor(s) 114, or the memory 116 can be operatively connected to the processor(s) 114 for use thereby.

In some instances, the memory 116 can be located wholly on the host vehicle 102 or the remote source(s) 104. In other instances, such as that shown in FIG. 1, memory 116 can be included on both the remote source(s) 104 and the host vehicle 102. Additionally, though not shown, the remote vehicle(s) 106 can also include memory 116.

As stated above, in the arrangement shown in FIG. 1, the remote source(s) 104 can include memory 116. The memory 116 for the remote source(s) 104 can be configured to store fleet data 118. The fleet data 118 can be or include data that corresponds to operating conditions for one or more vehicles at a particular location. "Operating conditions", as used herein, is data corresponding to how a vehicle is currently operating. For instance, operating conditions can correspond to an efficiency of operation of the vehicle. In this example, the operating conditions can take the form of an instantaneous or average miles per gallon (or miles per gallon equivalent). As another example, the vehicle can have operating conditions that correspond to acceleration profiles at or near a location (e.g., the manner in which the vehicle accelerates at or near a specific location), energy discharge, (for battery operated or hybrid vehicles) battery temperature, engine temperature, oil pressure, and the like. In all of these examples an operating condition for a vehicle can be or include data that corresponds to how the vehicle is being operated at a particular location.

The fleet data 118 can be compiled by the remote source(s) 104 based on data received via the communications system 108 from, for instance, the remote vehicle(s) 106. For example, the remote vehicle(s) 106 communicate their respective operating conditions at a particular location to the remote source(s) 104. Additionally, the remote vehicle(s) 106 can communicate the particular location corresponding to their respective operating condition. Accordingly, the remote source(s) 104 can receive, from the remote vehicle(s) 106, an operating condition and a location corresponding to the operating condition. The remote source(s) 104 can receive this data from the remote vehicle(s) 106 continuously, at predetermined intervals, or randomly. In other examples, the remote vehicle(s) 106 can request the data from the remote source(s) 104.

The remote source(s) 104 can timestamp the data when it is received from the remote vehicle(s) 106. As another example, the remote vehicle(s) 106 can timestamp the data when the data is acquired, generated, transmitted, etc.

The remote vehicle(s) 106 can also communicate their respective vehicle type to the remote source(s) 104. As stated above, examples of vehicle types include make and model (e.g., a Toyota Prius), body style (e.g., sedan, pick-up, recreational vehicle, minivan, etc.), type of energy (e.g., gasoline, diesel, battery, hybrid-electric, etc.) for powering a prime mover (e.g., engine, electrically powered motor, etc.), and combinations thereof. In this arrangement, the remote source(s) 104 can receive, from the remote vehicle(s) 106, a vehicle type for the respective remote vehicle 106, an operating condition for the remote vehicle 106, and a location corresponding to the operating condition.

The remote source(s) 104 can be configured to sort the fleet data 118 according to various parameters. For instance, the remote source(s) 104 can sort the fleet data 118 according to location. Additionally, within that location, the fleet data 118 can further be sorted by vehicle type. As one example, for a particular location, the remote source(s) 104 can include data from multiple remote vehicle(s) 106 that are located, or were previously located, at the particular location, and the data for that particular location can be sorted according to vehicle type for each of the multiple remote vehicle(s) 106.

The remote source(s) 104 can be configured to remove or filter according to the timestamp corresponding to the data. In this example, the remote source(s) 104 can ensure that the fleet data 118 is not stale.

In one or more arrangements, the memory 116 can include various instructions stored thereon. In one or more arrangements, the memory 116 can store one or more modules. Modules can be or include computer-readable instructions that, when executed by the processor(s) 114, cause the processor(s) 114 to perform the various functions disclosed herein. While the modules will be described herein with reference to functions for purposes of brevity, it should be understood that the modules include instructions that cause the processor(s) 114 to perform the described functions. Furthermore, although shown as being provided on the memory 116 for the host vehicle 102, the modules can be stored in memory 116 for the remote source(s) 104, for instance (i.e., the modules can be stored remote from the host vehicle 102 and be accessible thereby).

The memory 116 can include an operating conditions prediction module 120. The operating conditions prediction module 120 can include instructions to anticipate one or more operating conditions for the host vehicle 102. The operating conditions prediction module 120 can include instructions to anticipate the operating condition(s) of the host vehicle 102 at a forthcoming location (e.g., a location ahead of and along the route being traveled upon) of the host vehicle 102. The future operating condition(s) can be anticipated based, at least, on the operating conditions of other vehicles (e.g., one or more of the remote vehicle(s) 106) that are currently, or were previously, located at or near the forthcoming location of the host vehicle 102.

The operating conditions prediction module 120 can include instructions to determine one or more forthcoming location(s) of the host vehicle 102. In one example, the forthcoming location(s) of the host vehicle 102 can be determined at the host vehicle 102 based on inputs provided by an occupant of the host vehicle 102 to a navigation system 122. In another example, the forthcoming location(s) of the host vehicle 102 can be determined at, for instance, the remote source(s) 104 based on data provided to the navigation system 122. In both of these examples, the forthcoming location(s) of the host vehicle 102 are known locations, as they are located along a route to a destination selected by the occupant of the host vehicle 102. In still another example, the forthcoming location(s) of the host vehicle 102 may not be known locations. In this example, the forthcoming location(s) of the host vehicle 102 may be predicted based on, for example, profile data associated with the occupant of the host vehicle 102. For instance, the occupant of the host vehicle 102 may frequent a certain destination (e.g., the occupant's place of business) at a certain time during the week/day/etc. (e.g., 9:00 AM), and depart to another destination (e.g., the occupant's home) at a certain time (e.g., 5:00 PM). Data corresponding to habits such as these can be stored in a profile associated with the occupant. This data can be used to predict a likely destination and, therefore, forthcoming location(s) of the host vehicle 102. While these examples and arrangements are provided, forthcoming location(s) of the host vehicle 102 can be determined/predicted a number of different ways. Accordingly, the present disclosure is not limited to these examples and arrangements.

The operating conditions prediction module 120 can identify a subset of the fleet data 118 compiled at the remote source(s) 104 corresponding to one or more of the forthcoming location(s) of the host vehicle 102. The operating conditions prediction module 120 can determine the vehicle type for the host vehicle 102. The operating conditions prediction module 120 can identify the subset of fleet data 118 compiled at the remote source(s) 104 based on the vehicle type for the host vehicle 102. More specifically, the operating conditions prediction module 120 can identify the subset of fleet data 118 based on both the vehicle type and the location associated with the fleet data 118. As such, the subset of fleet data 118 can correspond to the vehicle type of the host vehicle 102 (e.g., the host vehicle 102 and the remote vehicle 106 providing the fleet data 118), and one or more of the forthcoming location(s) of the host vehicle 102. As a result, operating conditions of the host vehicle 102 can be better anticipated at the forthcoming location given knowledge of how similarly situated remote vehicle(s) 106 are operating (based on their operating conditions) when they are (or were) located at the forthcoming location.

The operating conditions prediction module 120 can include instruction to anticipate, based on the subset of fleet data 118, operating conditions for the host vehicle 102 when the host vehicle 102 is located at the forthcoming location. The operating conditions can be anticipated based on operating conditions provided from the remote vehicle(s) 106 that have the same vehicle type and are (or were) located proximate the forthcoming location. As such, the operating conditions prediction module 120 can include instructions to determine an anticipated operating condition for the host vehicle 102 when the host vehicle 102 is located at the forthcoming location, and the anticipated operating condition can be based on operating conditions provided from the remote vehicle(s) 106 that have the same vehicle type and are (or were) located proximate the forthcoming location.

The operating conditions prediction module 120 can include instructions to anticipate operating conditions including, but not limited to, an efficiency of operation (e.g., miles per gallon or miles per gallon equivalent for electric vehicles), acceleration profiles, energy discharge, battery temperature, engine temperature, oil pressure, and/or the like for the host vehicle 102 when the host vehicle 102 is located proximate the forthcoming location. Each of these anticipated operating conditions can correspond to the operating conditions within the subset of the fleet data 118. In some instances, the anticipated operating conditions can be in a one-to-one ratio of the operating conditions represented within the subset of the fleet data 118. In other instances, the anticipated operating conditions can be an average, a scaled factor, etc. of the operating conditions represented within the subset of the fleet data 118.

The memory 116 can include an energy range determination module 124. The energy range determination module 124 can include instructions to determine a remaining energy range for the host vehicle 102. The remaining energy range can be calculated based on data from the sensor system 112 corresponding to the remaining energy stored in the energy storage system(s) 110. Additionally, the remaining energy range can be calculated based on the anticipated operating condition(s) for the host vehicle 102 when the host vehicle 102 is located at the forthcoming location.

As one example, the operating conditions prediction module 120 can include instructions to anticipate an efficiency of operations for the host vehicle 102 at a plurality of forthcoming locations along a route to a destination. The energy range determination module 124 can include instructions to use the anticipated efficiency of operations for the host vehicle 102 to predict an energy consumption corresponding to the anticipated efficiency of operations at the plurality of forthcoming locations along the route. The energy range determination module 124 can include instructions to use the data from the sensor system 112 to calculate the remaining energy range based on the predicted energy consumption. Continuing the example, if the predicted energy consumption is known and the remaining energy stored in the energy storage system 110 is known, the remaining energy range (e.g., distance that the host vehicle 102 can travel before full depletion of energy) for the host vehicle 102 can be calculated.

As another example, the operating conditions prediction module 120 can include instructions to anticipate an energy discharge for the host vehicle 102 at a plurality of forthcoming locations along a route to a destination. The energy range determination module 125 can include instruction to use the anticipated energy discharge for the host vehicle to determine an anticipated energy discharge along the route to the destination. If the anticipated energy discharge is known and the remaining energy stored in the energy storage system 110 is known, the remaining energy range for the host vehicle 102 can be calculated.

While these two examples are provided for determining the remaining energy range, additional examples can be used, and additional or alternative operating conditions can be used from the remote vehicle(s) 106, provided the remote vehicle(s) 106 have the same vehicle type as the host vehicle 102 and is (or was) located at the forthcoming location.

The host vehicle 102 can include one or more input/output (I/O) systems 126. The I/O system(s) 126 can be or include any component or group of components configured to receive inputs from (e.g., an input system) or provide information to (e.g., an output system) one or more occupants of the host vehicle 102. An "input system" includes any device, component, system, element or arrangement or groups thereof that enable information/data to be entered into a machine. The input system can be configured to receive an input from a vehicle occupant (e.g. a driver or a passenger). Any suitable input system can be used, including, for example, a keypad, display, touch screen, multi-touch screen, button, joystick, mouse, trackball, microphone and/or combinations thereof. Similarly, an "output system" includes any device, component, system, element or arrangement or groups thereof that enable information/data to be presented to the vehicle occupant. The output system can be configured to present information/data to a vehicle occupant. The output system can include a display. Alternatively, or in addition, the output system may include an earphone and/or speaker. Some components of the host vehicle 102 may serve as both a component of the input system and a component of the output system.

The output system of the I/O system(s) 126 can be configured to provide information relating to the remaining energy range for the host vehicle 102 to occupants of the host vehicle 102. For instance, the output system can display text stating the remaining energy range (e.g., N miles remaining), a dial showing the remaining energy range (similar to the fuel gauge), etc. The remaining energy range provided by the output system to the occupant can be used by the occupant to determine whether he or she has sufficient energy to travel to their desired destination.

In some instances, the energy range determination module 124 can include instructions to determine whether the host vehicle 102 has sufficient energy stored in the energy storage system 110 to arrive at the destination provided by the occupant of the host vehicle 102. The energy range determination module 124 can compare the travel distance to the destination with the remaining energy range. The energy range determination module 124 can include instructions to provide a notification to the occupant of the host vehicle 102 if the travel distance to the destination exceeds the remaining energy range. The notification can direct the occupant of the host vehicle 102 to re-energize the host vehicle 102. Additionally or alternatively, the notification can provide one or more energy conservation tips to the occupant of the host vehicle 102. This is particularly relevant where the occupant is driving the host vehicle 102. The energy conservation tips can be, for instance, directing the occupant to not accelerate as much, lower the radio or HVAC settings, roll up the windows, etc.

As will be discussed in greater detail below, in one or more arrangements, the host vehicle 102 can include an autonomous driving system 128. The autonomous driving system 128 can be or include any component or group of components configured to exercise autonomous control (e.g., control without input from a driver) over the host vehicle 102. In arrangements where the host vehicle 102 includes an autonomous driving system 128, the autonomous driving system 128 can be activated responsive to the travel distance to the destination exceeding the remaining energy range for the host vehicle 102. In these arrangements, the host vehicle 102 can operate in an autonomous or semi-autonomous mode to thereby conserve energy, since the host vehicle 102 operating in an autonomous or semi-autonomous mode may implement driving maneuvers that are more energy conservative than a human driver. The autonomous driving system 128 can include components to determine a path for the host vehicle 102 to implement. The path can be determined based, at least, on conserving energy consumption. For instance, the path can include maneuvers where the host vehicle 102 may not brake as hard or accelerate as fast as opposed to a driver operating the host vehicle 102 in manual mode. As another example, the path may divert the host vehicle 102 to a different route that would conserve energy consumption. The autonomous driving system 128 can include components to control the host vehicle 102 and cause the host vehicle 102 to implement the path and thereby conserve energy consumption.

Figure 2:
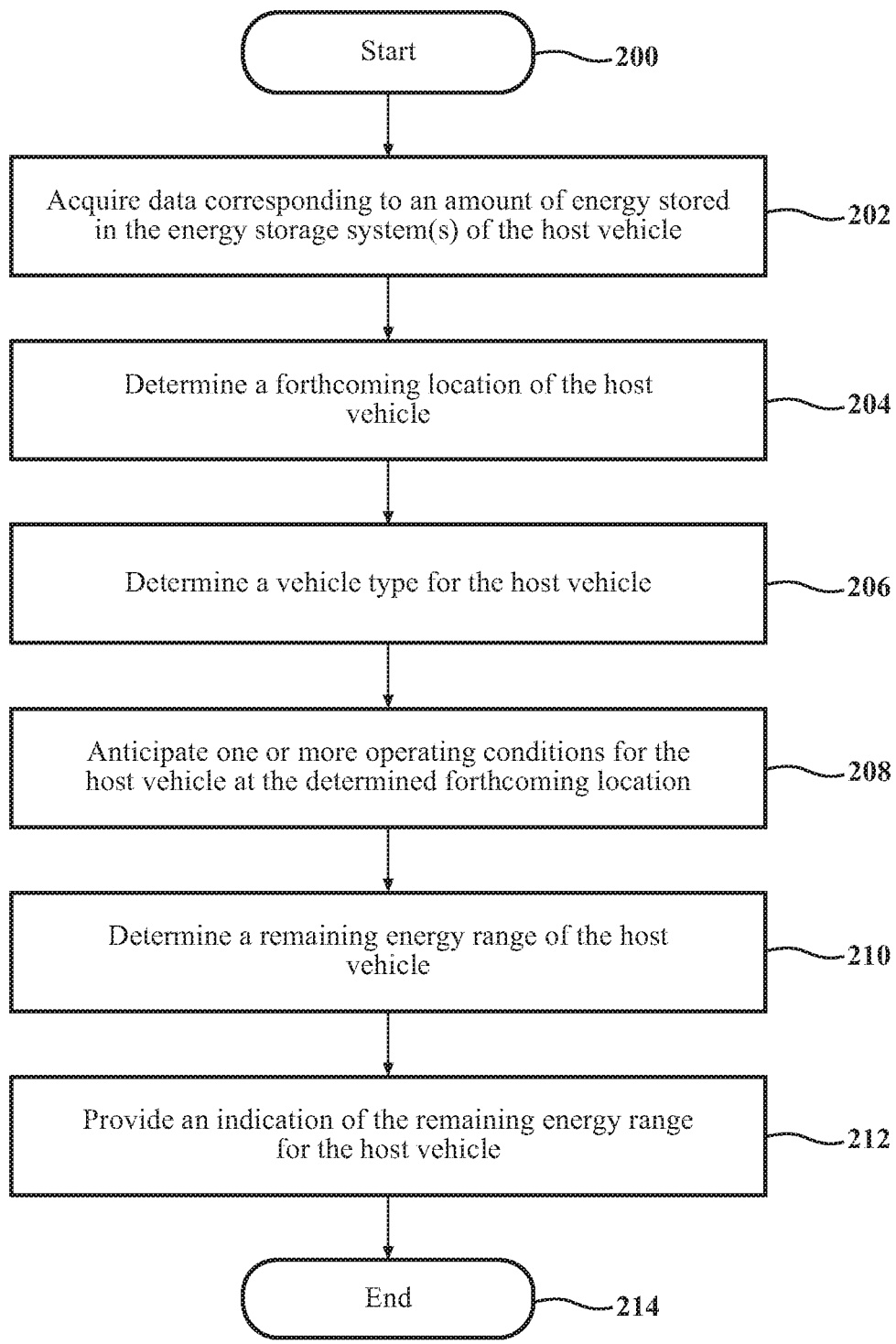
FIG. 2 is a flowchart showing an example method for determining an energy range of the host vehicle.

Now that various aspects of the system 100 have been described, a method for indicating an energy range of a vehicle will be described with reference to FIG. 2. The flowchart shown in FIG. 2 is only for purposes of providing an example method. The following disclosure should not be limited to each and every function block shown in FIG. 2. To the contrary, the method does not require each and every function block shown. In some examples, the method may include additional function blocks. Further, the method does not need to be performed in the same chronological order shown in FIG. 2.

The method can begin at starting block 200. The method can start when the host vehicle 102 is turned on, when the transmission of the host vehicle 102 is shifted out of park, etc. The method can continue to function block 202.

At function block 202, one or more sensors in the sensor system 112 can acquire data corresponding to an amount of energy stored in the energy storage system(s) 110 of the host vehicle 102. For instance, the one or more sensors can acquire data corresponding to the remaining fuel in the fuel tanks, remaining battery charge for the batteries, etc. The method can continue to function block 204.

At function block 204, the processor(s) 114 can determine a forthcoming location of the host vehicle 102 using instructions from the operating conditions prediction module 120. In one example, the forthcoming location(s) of the host vehicle 102 can be determined by processor(s) 114 of the host vehicle 102 based on inputs provided by an occupant of the host vehicle 102 to a navigation system 122. In another example, the forthcoming location(s) of the host vehicle 102 can be determined by processor(s) 114 that may be located at the remote source(s) 104 based on data provided to the navigation system 122. In both of these examples, the forthcoming location(s) of the host vehicle 102 are known locations, as they are located along a route to a destination selected by the occupant of the host vehicle 102. In still another example, the forthcoming location(s) of the host vehicle 102 may not be known locations. The method can continue to function block 206.

At function block 206, the processor(s) 114 can determine a vehicle type for the host vehicle 102. In some arrangements, the processor(s) 114 can access data stored at the host vehicle 102. The data can be indicative of the vehicle type for the host vehicle 102. In other arrangements, the remote source(s) 104 can receive data indicative of the vehicle type from the host vehicle 102. The method can proceed to function block 208.

At function block 208, the processor(s) 114 can anticipate one or more operating conditions for the host vehicle 102 using instructions from the operating conditions prediction module 120. The processor(s) 114 (at the host vehicle 102 and/or the remote source(s) 104) can anticipate one or more operating conditions for the host vehicle 102 at the determined forthcoming location (e.g., the location determined at function block 204). The processor(s) 114 can anticipate conditions based on data stored at the remote source(s) 104. More specifically, the processor(s) 114 can anticipate conditions based on a subset of compiled fleet data 118 from the remote source(s) 104. The subset can include at least one operating condition provided by a remote vehicle 106 that has the same vehicle type as the host vehicle 102 and was provided by the remote vehicle 106 when it was located proximate to the forthcoming location of the host vehicle 102. As such, the processor(s) 114 can anticipate operating conditions for the host vehicle 102 at a forthcoming location based on similarly situated remote vehicles 106 when they were located at or proximate to the forthcoming location. The method can proceed to function block 210.

At function block 210, the processor(s) 114 can determine a remaining energy range of the host vehicle 102 using instructions from the energy range determination module 124. The processor(s) 114 can determine the remaining energy range based on the amount of energy stored in the energy storage system 110 (based on data acquired at function block 202) and an anticipated operating condition for the host vehicle 102 (as determined at function block 208). The method can continue to function block 212.

At function block 212, the processor(s) 114 can control the output system of the I/O system(s) 126 to provide an indication of the remaining energy range determined at function block 210. From function block 212, the method can proceed to ending block 214.

At ending block 214, the method can end. The method can end when the determined energy range is indicated to the occupant of the host vehicle 102.

Figure 3B:
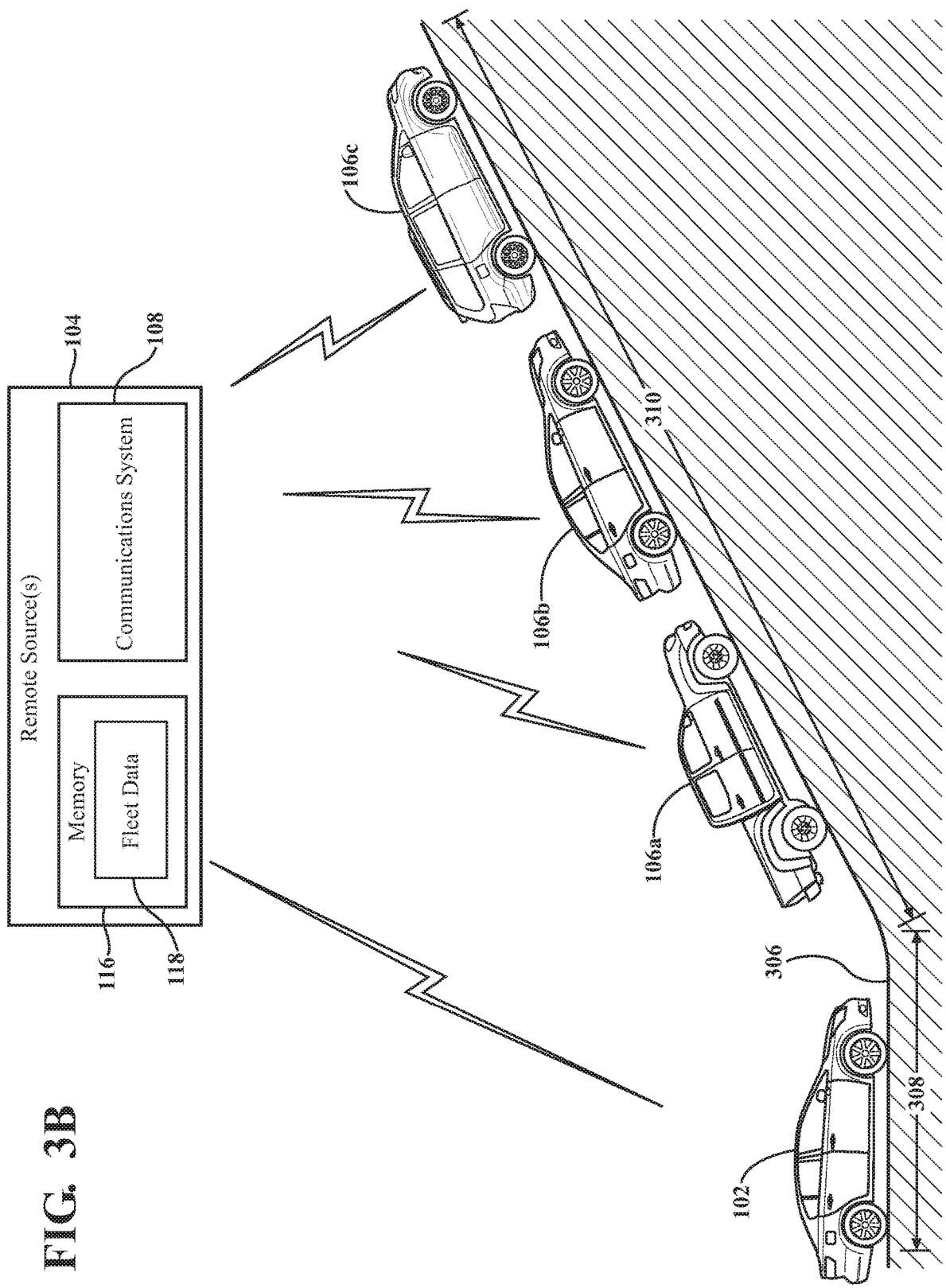

Referring now to FIG. 3A-3B, two example environments are shown. The following examples are provided for adding clarity to the present disclosure. However, the present disclosure should not be construed to be limited to these examples.

In the first environment shown in FIG. 3A, the host vehicle 102 is operating along a road 300. As shown, the road 300 is relatively flat (e.g., limited to no slope or grade) in a first portion 302 of the road 300. Additionally, the road 300 has a relatively steep decline (e.g., slope or grade in the negative direction defined by the direction of travel of the host vehicle 102) in a second portion 304 of the road 300.

Additionally, three remote vehicles 106a, 106b, 106c are operating along the second portion 304 of the road 300. The first remote vehicle 106a is shown as having a vehicle type of a pickup truck, the second remote vehicle 106b is shown as having a vehicle type of a sedan, and the third remote vehicle 106c is shown as having a vehicle type of a van. Additionally, the host vehicle 102 is shown as having a vehicle type of a sedan (e.g., the same vehicle type as the second remote vehicle 106b).

Each of the remote vehicles 106a-106c transmit their current operating conditions via respective communications systems 108 (of FIG. 1) to the remote source(s) 104. The operating conditions can be indicative of the relatively steep decline of the second portion 304 of the road 300. For instance, the operating conditions can be a current miles per gallon (or miles per gallon equivalent) which is relatively high. The miles per gallon (or miles per gallon equivalent) would be relatively high because the remote vehicles 106a-106c are able to coast down the hill, thus limiting energy consumption of the respective remote vehicles 106a-106c.

The operating conditions can be received by the remote source(s) 104 via its communications system 108. The operating conditions are compiled by the remote source(s) 104 as fleet data 118. Within the compiled fleet data 118, the operating conditions can be sorted according to the respective operating condition's corresponding location. Further, the operating conditions can be sorted according to the respective remote vehicle's vehicle type (e.g., pickup truck, sedan, van). Accordingly, for the second portion of the road 300, the fleet data 118 will include three data entries of operating conditions for three different vehicle types—one for a pickup truck corresponding to remote vehicle 106*a*, one for a sedan corresponding to remote vehicle 106*b*, and one for a van corresponding to remote vehicle 106*c*.

The operating conditions prediction module 120 (of FIG. 1) can include instructions to determine a forthcoming location for the host vehicle 102. In this example, the forthcoming location can include one or more locations along the second portion 304 of the road 300. The operating conditions prediction module 120 can also determine a vehicle type for the host vehicle 102 (e.g., a sedan in this example). The operating conditions prediction module 120 can include instructions to identify a subset of the fleet data 118 compiled at the remote source(s) 104 based on the vehicle type for the host vehicle 102. The subset of fleet data 118 can correspond to the vehicle type of the host vehicle 102 (e.g., the host vehicle 102 has the same vehicle type as the remote vehicle 106 providing the fleet data), and the forthcoming location of the host vehicle 102. In this example, the subset of fleet data 118 can include the data corresponding to operating conditions for the second remote vehicle 106*b*, as the second remote vehicle 106*b* and the host vehicle 102 have the same vehicle type (sedan), and the second remote vehicle 106*b* is located at a forthcoming location of the host vehicle 102 (a location along the second portion 304 of the road 300).

The operating conditions prediction module 120 can include instructions to anticipate operating conditions including, for example, an efficiency of operation (e.g., miles per gallon or miles per gallon equivalent for electric vehicles). The anticipated operating condition for the host vehicle 102 can correspond to the operating conditions within the subset of the fleet data 118. In some instances, the anticipated operating conditions can be in a one-to-one ratio of the operating conditions within the subset of the fleet data 118. In other instances, the anticipated operating conditions can be an average, a scaled factor, etc. of the operating conditions within the subset of the fleet data 118.

The host vehicle 102 can include one or more sensors of the sensor system(s) 112 that acquires data corresponding to the remaining energy stored in the energy storage system 110 of the host vehicle 102. Such sensors may acquire data corresponding to the remaining fuel level, the remaining battery charge, and/or combinations thereof.

The energy range determination module 124 can include instructions to determine a remaining energy range for the host vehicle 102. The remaining energy range can be calculated based on data from the sensor system 112 corresponding to the remaining energy stored in the energy storage system(s) 110. Additionally, the remaining energy range can be calculated based on the anticipated operating condition(s) for the host vehicle 102 when the host vehicle 102 is located at the forthcoming location (e.g., at a location along the second portion 304 of the road 300).

As one example, the operating conditions prediction module 120 can include instructions to anticipate an efficiency of operations for the host vehicle 102 at a plurality of forthcoming locations (including one or more locations along the second portion 304 of the road 300) along a route to a destination. The energy range determination module 124 can include instructions to use the anticipated efficiency of operations for the host vehicle 102 to predict an energy consumption corresponding to the anticipated efficiency of operations at the plurality of forthcoming locations along the route. The energy range determination module 124 can include instructions to use the data from the sensor system 112 to calculate the remaining energy range based on the predicted energy consumption. In this example, the anticipated efficiency of operations for the host vehicle 102 can increase as the host vehicle 102 descends down the second portion 304 of the road 300, since the host vehicle 102 will be able to coast down the second portion 304 rather than using significant energy. Thus, the remaining energy range for the host vehicle 102 will increase based on the data in the subset of fleet data 118. The output system of the I/O system(s) 126 are then controlled to provide an indication of the remaining energy range determined via the energy range determination module 124.

In the second environment shown in FIG. 3B, the host vehicle 102 is operating along a road 306. As shown, the road 306 is relatively flat (e.g., limited to no slope or grade) in a first portion 308 of the road 306. Additionally, the road 306 has a relatively steep incline (e.g., slope or grade in the positive direction defined by the direction of travel of the host vehicle 102) in a second portion 310 of the road 306.

Additionally, three remote vehicles 106*a*, 106*b*, 106*c* are operating along the second portion 310 of the road 306. The first remote vehicle 106*a* is shown as having a vehicle type of a pickup truck, the second remote vehicle 106*b* is shown as having a vehicle type of a sedan, and the third remote vehicle 106*c* is shown as having a vehicle type of a van. Additionally, the host vehicle 102 is shown as having a vehicle type of a sedan (e.g., the same vehicle type as the second remote vehicle 106*b*).

Each of the remote vehicles 106*a*-106*c* transmit their current operating conditions via respective communications systems 108 (of FIG. 1) to the remote source(s) 104. The operating conditions can be indicative of the relatively steep incline of the second portion 310 of the road 306. For instance, the operating conditions can be a current miles per gallon (or miles per gallon equivalent) which is relatively low. The miles per gallon (or miles per gallon equivalent) would be relatively low because the remote vehicles 106*a*-106*c* must climb the hill and thereby consume more energy than if the remote vehicles 106*a*-106*c* were operating on a flat portion (e.g., first portion 308) or descending a hill (e.g., second portion 304 of FIG. 3A).

The operating conditions can be received by the remote source(s) 104 via its communications system 108. The operating conditions are compiled by the remote source(s) 104 as fleet data 118. Within the compiled fleet data 118, the operating conditions can be sorted according to the respective operating condition's corresponding location. Further, the operating conditions can be sorted according to the respective remote vehicle's vehicle type (e.g., pickup truck, sedan, van). Accordingly, for the second portion of the road 306, the fleet data 118 will include three data entries of operating conditions for three different vehicle types—one for a pickup truck corresponding to remote vehicle 106*a*, one for a sedan corresponding to remote vehicle 106*b*, and one for a van corresponding to remote vehicle 106*c*.

The operating conditions prediction module 120 (of FIG. 1) can include instructions to determine a forthcoming location for the host vehicle 102. In this example, the forthcoming location can include one or more locations along the second portion 310 of the road 306. The operating conditions prediction module 120 can also determine a vehicle type for the host vehicle 102 (e.g., a sedan in this example). The operating conditions prediction module 120 can include instructions to identify a subset of the fleet data 118 compiled at the remote source(s) 104 based on the vehicle type for the host vehicle 102. The subset of fleet data 118 can correspond to the vehicle type of the host vehicle 102 (e.g., the host vehicle 102 has the same vehicle type as the remote vehicle 106 providing the fleet data), and the forthcoming location of the host vehicle 102. In this example, the subset of fleet data 118 can include the data corresponding to operating conditions for the second remote vehicle 106b, as the second remote vehicle 106b and the host vehicle 102 have the same vehicle type (sedan), and the second remote vehicle 106b is located at a forthcoming location of the host vehicle 102 (a location along the second portion 310 of the road 306).

The operating conditions prediction module 120 can include instructions to anticipate operating conditions including, for example, an efficiency of operation (e.g., miles per gallon or miles per gallon equivalent for electric vehicles). The anticipated operating condition for the host vehicle 102 can correspond to the operating conditions within the subset of the fleet data 118. In some instances, the anticipated operating conditions can be in a one-to-one ratio of the operating conditions within the subset of the fleet data 118. In other instances, the anticipated operating conditions can be an average, a scaled factor, etc. of the operating conditions within the subset of the fleet data 118.

The host vehicle 102 can include one or more sensors of the sensor system(s) 112 that acquires data corresponding to the remaining energy stored in the energy storage system 110 of the host vehicle 102. Such sensors may acquire data corresponding to the remaining fuel level, the remaining battery charge, and/or combinations thereof.

The energy range determination module 124 can include instructions to determine a remaining energy range for the host vehicle 102. The remaining energy range can be calculated based on data from the sensor system 112 corresponding to the remaining energy stored in the energy storage system(s) 110. Additionally, the remaining energy range can be calculated based on the anticipated operating condition(s) for the host vehicle 102 when the host vehicle 102 is located at the forthcoming location (e.g., at a location along the second portion 310 of the road 306).

As one example, the operating conditions prediction module 120 can include instructions to anticipate an efficiency of operations for the host vehicle 102 at a plurality of forthcoming locations (including one or more locations along the second portion 310 of the road 306) along a route to a destination. The energy range determination module 124 can include instructions to use the anticipated efficiency of operations for the host vehicle 102 to predict an energy consumption corresponding to the anticipated efficiency of operations at the plurality of forthcoming locations along the route. The energy range determination module 124 can include instructions to use the data from the sensor system 112 to calculate the remaining energy range based on the predicted energy consumption. In this example, the anticipated efficiency of operations for the host vehicle 102 can decrease as the host vehicle 102 climbs the second portion 310 of the road 306, since the host vehicle 102 will have to consume more energy to climb the second portion 310 of the road 306. Thus, the remaining energy range for the host vehicle 102 will decrease based on the data in the subset of fleet data 118. The output system of the I/O system(s) 126 are then controlled to provide an indication of the remaining energy range determined via the energy range determination module 124.

Referring back to FIG. 1, in one or more examples, the host vehicle 102 can be an autonomous vehicle. As used herein, "autonomous vehicle" refers to a vehicle that operates in an autonomous mode. "Autonomous mode" means one or more computing systems are used to navigate, maneuver, and/or control the host vehicle 102 along a travel route or path with minimal or no input from a human driver. In one or more examples, the host vehicle 102 can be highly automated or completely automated. In one or more arrangements, the host vehicle 102 can be configured with one or more semi-autonomous modes in which one or more computing systems perform a portion of the navigation and/or maneuvering of the host vehicle 102 along a travel route, and a vehicle operator (i.e., a human driver) provides inputs to the host vehicle 102 to perform a portion of the navigation and/or maneuvering of the host vehicle 102. In one or more arrangements, the host vehicle 102 is configured one or more semi-autonomous operational modes in which one or more computing systems control one or more components of the host vehicle 102 to cause the host vehicle 102 to follow a modified path deviating from the current path being followed by the human driver. In this example, the one or more computing systems control one or more components of the host vehicle 102 to cause the host vehicle 102 to follow a modified path responsive to determining a deviation from the current path being followed by the human driver.

The host vehicle 102 can have one or more semi-autonomous operational modes in which a portion of the navigation and/or maneuvering of the host vehicle 102 along a travel route is performed by one or more computing systems, and a portion of the navigation and/or maneuvering of the host vehicle 102 along a travel route is performed by a human driver. One example of a semi-autonomous operational mode is when an adaptive cruise control system is activated. In such case, the speed of the vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

In some instances, the host vehicle 102 can be configured to selectively switch between various operational modes (e.g., an autonomous mode, one or more semi-autonomous modes, and/or a manual mode). Such switching can be implemented in a suitable manner, now known or later developed. The switching can be performed automatically, selectively, or it can be done responsive to receiving a manual input or request.

The host vehicle 102 can include one or more path planners 130. The path planner(s) 130 can include instructions to communicate with the various vehicle systems 132. In one or more arrangements, the processor(s) 114 can be operatively connected to communicate with the various vehicle systems 132 and/or individual components thereof according to, at least in part, instructions included on the path planner(s) 130. For example, the processor(s) 114 can be in communication to send and/or receive information from the various vehicle systems 132 to control the movement, speed, maneuvering, heading, direction, etc. of the host vehicle 102. The processor(s) 114 can control some or all of these vehicle systems 132 and, thus, the host vehicle 102 can be partially or fully autonomous.

The processor(s) 114 can be operable to control the navigation and/or maneuvering of the host vehicle 102 by controlling one or more of the host vehicle 102 systems and/or components thereof. For instance, when operating in an autonomous or semi-autonomous mode, the processor(s) 114 can control the direction and/or speed of the host vehicle 102 based, at least in part, on instructions from the path planner(s) 130. The path planner(s) 130 can include instructions that cause the host vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The host vehicle 102 can include one or more actuators 134. The actuators 134 can be any element or combination of elements operable to modify, adjust and/or alter one or more of the host vehicle 102 systems or components thereof responsive to receiving signals or other inputs from the processor(s) 114, the path planner(s) 130, and/or other module(s). Any suitable actuator can be used. For instance, the one or more actuators 134 can include motors, pneumatic actuators, hydraulic pistons, relays, solenoids, and/or piezoelectric actuators, just to name a few possibilities.

In one or more arrangements, the path planner(s) 130 can be configured to receive data from the sensor system(s) 112 and/or any other type of system capable of capturing information relating to the host vehicle 102 and/or the external environment of the host vehicle 102. In one or more arrangements, the path planner(s) 130 can use such data to generate one or more driving scene models. The path planner(s) 130 can determine position and velocity of the host vehicle 102. The path planner(s) 130 can determine the location of objects, or other environmental features including traffic signs, trees, shrubs, neighboring vehicles, pedestrians, etc.

The path planner(s) 130 can include instructions to determine path(s), current autonomous driving maneuvers for the host vehicle 102, future autonomous driving maneuvers and/or modifications to current autonomous driving maneuvers based on data acquired by the sensor system(s) 112, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle, changing travel lanes, merging into a travel lane, and/or reversing, just to name a few possibilities. The path planner(s) 130 can include instructions to cause, directly or indirectly, such autonomous driving maneuvers to be implemented. The path planner(s) 130 can include instructions to execute various vehicle functions and/or to transmit data to, receive data from, interact with, and/or control the vehicle or one or more systems thereof (e.g. one or more of vehicle systems).

In one or more arrangements, the path planner(s) 130 can include instructions to use data corresponding to the upcoming portion of the roadway 115 for the host vehicle 102 (the proceeding path) to determine the path for the host vehicle 102 to follow. The path planner(s) 130 can determine the path for the host vehicle 102 to follow according to the road state vector. According to arrangements described herein, the host vehicle 102 can be configured to generate a path for the host vehicle 102 to follow using instructions from the path planner(s) 130. In one or more arrangements, the path can be defined by one or more driving maneuvers. However, alternatively or in addition, the path can be defined in any other suitable manner. Such driving maneuvers can include a movement in the lateral direction and/or the longitudinal direction of the vehicle. When the host vehicle 102 is an autonomous vehicle or operating in an autonomous mode, the vehicle can be caused to implement the determined path by issuing instructions to the actuator(s) 134 to control various vehicle system(s) 132 to implement the determined path.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the drawings, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A system for indicating an energy range of a host vehicle, the system comprising:
    an energy storage system for storing one or more types of energy for powering a prime mover of the host vehicle;
    a sensor for acquiring data corresponding to an amount of energy stored in the energy storage system;
    an output system for providing, to an occupant of the host vehicle, information corresponding to the amount of energy stored in the energy storage system;
    a communications system for communicating with one or more remote sources, the one or more remote sources configured to compile data from a plurality of vehicles with each respective vehicle of the plurality of vehicles having a vehicle type, the compiled data including at least one operating condition at a respective location, provided from each respective vehicle of the plurality of vehicles;
    one or more processors operatively connected to the sensor, the output system, and the communications system; and
    memory operatively connected to the processor, the memory storing instructions that, when executed by the processor, cause the processor to:
        control the output system of the host vehicle to provide an indication of a remaining energy range for the vehicle, the remaining energy range being determined based on:
            1) the amount of energy stored in the energy storage system corresponding to the data acquired by the sensor; and
            2) an anticipated operating condition for a forthcoming location of the host vehicle, the forthcoming location being along a route to a destination for the host vehicle, the anticipated operating condition being determined based on a subset of the compiled data, the subset including the at least one operating condition at a respective location, provided from two or more of the plurality of vehicles that have traversed the respective location and that have a vehicle type that is the same as a vehicle type of the host vehicle, the respective location being proximate to the forthcoming location of the host vehicle, the vehicle type for the host vehicle and the two or more of the plurality of vehicles including:
                1) the same make and model;
                2) the same body style; and
                3) powered by the same type of prime mover when located proximate to the forthcoming location.

2. The system of claim 1, wherein the memory further stores instructions to:
    retrieve, via the communications system, the subset of the compiled data from the one or more remote sources for the at least one of the plurality of vehicles; and
    determine the remaining energy range based, at least, on 1) the data corresponding to the amount of energy stored in the energy storage system and 2) the subset of the compiled data retrieved from the one or more remote sources.

3. The system of claim 1, wherein the memory further stores instructions to:
    transmit, via the communications system to the one or more remote sources, the data acquired by the sensor; and
    receive, via the communication system from the one or more remote sources, the remaining energy range determined by the one or more remote sources.

4. The system of claim 3, wherein the memory further stores instructions to:
    transmit, via the communications system to the one or more remote sources, information corresponding to the route along which the host vehicle will be traveling.

5. The system of claim 4, wherein the route is based on information provided by the occupant of the host vehicle to a navigation system.

6. The system of claim 4, wherein the route is a predicted route based, at least, on information associated with the occupant of the host vehicle.

7. The system of claim 1, wherein the vehicle type for the host vehicle and the at least one of the plurality of vehicles is based on a type of prime mover used for powering the host vehicle and the at least one of the plurality of vehicles.

8. The system of claim 7, wherein the type of prime mover includes, at least, a fuel powered engine, an electrically powered motor.

9. The system of claim 1, wherein the compiled data is sorted according to location and vehicle type for each data entry received from a respective one of the plurality of vehicles.

10. The system of claim 1, wherein the host vehicle is an autonomous vehicle, the system further comprises:
   one or more actuators arranged to control one or more vehicle systems of the host vehicle, and wherein the memory further includes instructions to:
   determine a path for the autonomous vehicle to implement, the path being determined based, at least, on conserving energy consumption; and
   control the one or more actuators to implement the path and thereby conserve energy consumption.

11. The system of claim 1, wherein the memory further stores instructions to:
   determine a distance to the destination for the host vehicle;
   compare the remaining energy range and the distance to the destination for the host vehicle; and
   control the output system to render a notification to the occupant of the host vehicle responsive to the distance to the destination being greater than the remaining energy range.

12. The system of claim 11, wherein the notification provides one or more energy conservation tips to the occupant of the host vehicle.

13. The system of claim 11, wherein the notification instructs the occupant to re-energize the host vehicle.

14. The system of claim 11, wherein the host vehicle includes an autonomous driving system, and wherein the memory further includes instructions to:
   activate the autonomous driving system responsive to the distance to the destination being greater than the remaining energy range.

15. The system of claim 1, wherein the host vehicle is an autonomous vehicle, the system further comprises:
   one or more actuators arranged to control one or more vehicle systems of the host vehicle, and wherein the memory further includes instructions to:
   determine a distance to the destination for the host vehicle along the route;
   compare the remaining energy range and the distance to the destination for the host vehicle along the route;
   responsive to the distance being greater than the remaining energy, determine a different route for the host vehicle, the different route being determined based, at least, on conserving energy consumption; and
   control the one or more actuators to implement the different route.

16. A method for indicating an energy range of a host vehicle, the method comprising:
   acquiring, via a sensor in the host vehicle, data corresponding to an amount of energy stored in an energy storage system of the host vehicle; and
   controlling an output system of the host vehicle to provide an indication of a remaining energy range for the host vehicle, the remaining energy range being determined based on:
   1) the amount of energy stored in the energy storage system based on data acquired by the sensor; and
   2) an anticipated operating condition for a forthcoming location of the host vehicle, the forthcoming location being along a route to a destination for the host vehicle, the anticipated operating condition being determined based on a subset of compiled data from one or more remote sources, the subset including at least one operating condition at a respective location, provided from a plurality of vehicles that have a vehicle type that is the same as a vehicle type of the host vehicle, the respective location being proximate to the forthcoming location of the host vehicle, the vehicle type for the host vehicle and the plurality of vehicles including:
   1) the same make and model;
   2) the same body style; and
   3) powered by the same type of prime mover when located proximate to the forthcoming location.

17. The method of claim 16, further comprising:
   retrieving, via a communications system of the host vehicle, the subset of the compiled data from the one or more remote sources for the at least one of a plurality of vehicles; and
   determining the remaining energy range based, at least, on 1) the acquired data corresponding to the amount of energy stored in the energy storage system and 2) the subset of compiled data retrieved from the one or more remote sources.

18. The method of claim 16, further comprising:
   transmitting, via a communications system of the host vehicle to the one or more remote sources, the acquired data corresponding to the amount of energy stored in the energy storage system; and
   receiving, via the communications system from the remote source, the remaining energy range determined by the one or more remote sources.

19. A method for determining an energy range of a host vehicle, the method comprising:
   receiving data acquired by a sensor arranged to detect an amount of energy stored in an energy storage system of the host vehicle;
   determining a forthcoming location of the host vehicle, the forthcoming location being along a route to a destination for the host vehicle;
   determining a vehicle type for the host vehicle;
   determining an anticipated operating condition for the host vehicle when the host vehicle is located at the forthcoming location, the anticipated operating condition being determined based on a subset of compiled data from one or more remote sources, the subset including at least one operating condition provided from a plurality of vehicles that have a vehicle type that is the same as a vehicle type of the host vehicle that was also provided by the plurality of vehicles when the plurality of vehicles were at a respective location that is proximate to the forthcoming location of the host vehicle, the vehicle type for the host vehicle and the plurality of vehicles including:
   1) the same make and model;
   2) the same body style; and
   3) powered by the same type of prime mover when located proximate to the forthcoming location; and
   determining, based on the anticipated operating condition and the data acquired by the sensor, a remaining energy range of the host vehicle, the remaining energy range of the host vehicle being rendered on an output system of the host vehicle to indicate the remaining energy range of the host vehicle to an occupant of the host vehicle.

* * * * *

UNITED STATES PATENT AND TRADEMARK OFFICE
CERTIFICATE OF CORRECTION

PATENT NO. : 11,065,959 B2
APPLICATION NO. : 15/916662
DATED : July 20, 2021
INVENTOR(S) : Nikolaos Michalakis It is certified that error appears in the above-identified patent and that said Letters Patent is hereby corrected as shown below:

In the Specification

Column 19, Line 51: Insert --the scope hereof.-- in place of "the scope hereof"

In the Claims

Claim 3, Column 20, Line 52: Insert --receive, via the communications system from the one or-- in place of "receive, via the communication system from the one or"

Signed and Sealed this
Twenty-first Day of June, 2022

Katherine Kelly Vidal
*Director of the United States Patent and Trademark Office*